Sept. 12, 1961            H. NERWIN            2,999,440

AUTOMATIC EXPOSURE CONTROL FOR PHOTOGRAPHIC CAMERA

Filed Dec. 5, 1958            3 Sheets-Sheet 1

Hubert Nerwin
INVENTOR.

BY R. Frank Smith
Robert W. Hampton
ATTORNEYS

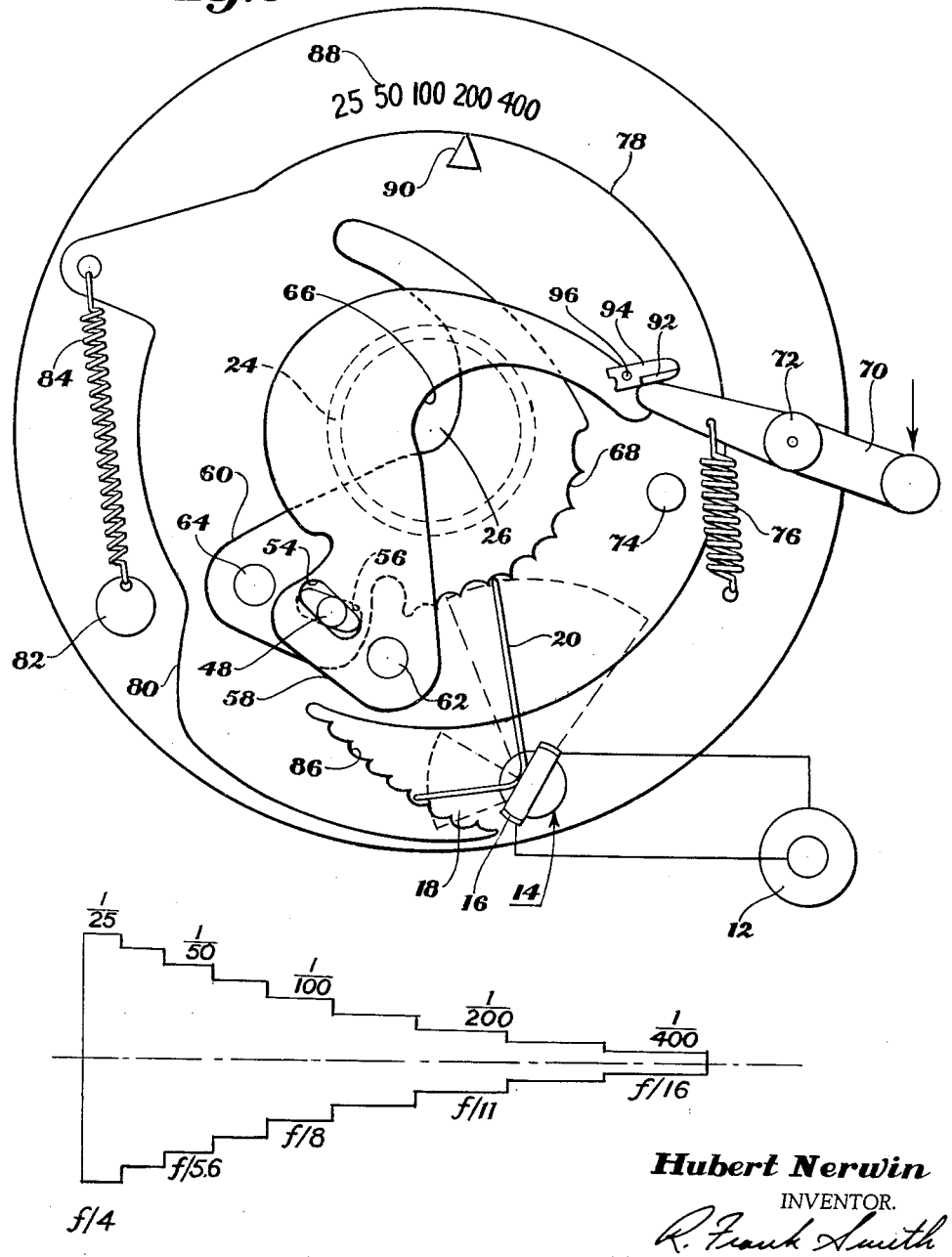

United States Patent Office 2,999,440
Patented Sept. 12, 1961

2,999,440
AUTOMATIC EXPOSURE CONTROL FOR PHOTOGRAPHIC CAMERA
Hubert Nerwin, Rochester, N.Y., assignor to Eastman Kodak Company, Rochester, N.Y., a corporation of New Jersey
Filed Dec. 5, 1958, Ser. No. 778,431
8 Claims. (Cl. 95—10)

The present invention concerns automatic exposure control systems in photographic cameras and more particularly concerns such control systems wherein both shutter speed and diaphragm aperture are variable and are automatically controlled.

In most prior art cameras having automatic exposure control systems, either the shutter speed or the diaphragm aperture is set automatically in response to some measurement of the intensity of light from the viewed scene. Where one of these exposure factors is set automatically it has been the practice either to maintain the other constant or to vary it manually. If one exposure factor remains constant, the range of exposure values for which the camera can be used is relatively limited. On the other hand, if the nonautomatic exposure factor must be varied manually, this defeats a primary purpose of automatic exposure control systems, viz.; minimizing the effort required of the person operating the camera.

It is therefore a principal object of the present invention to automatically set both the shutter speed and the diaphragm opening of the camera as related functions of the intensity of light from a viewed scene. This object may be accomplished by energizing a moving coil electric instrument, or galvanometer, as a function of the light intensity from the viewed scene, then setting both the shutter speed and the diaphragm opening in accordance with the degree of energization of the galvanometer.

Another object of the invention is to effect a significant economy in machine parts by employing a single set of blades as both a shutter and a diaphragm. The size of a variable aperture in the blades is controlled by setting a diaphragm opening; the duration of the open condition of the blades is controlled by setting a shutter speed.

A more particular object, in a camera having a camera operating lever and a moving coil that is positioned in accordance with the intensity of viewed light, is to render three operations serially responsive to the manual depression of the camera operating lever, viz.; (1) conditioning shutter speed as a function of the position of the moving coil, (2) triggering the shutter, and (3) limiting the opening of the shutter-diaphragm blades as a function of the position of the moving coil.

Another object of the invention is to permit a part of a shutter drive lever to be moved through a full cyclic stroke while differentially limiting the cyclic movement of a set of shutter-diaphragm blades driven by that lever.

Other objects of the invention will appear from the following description, reference being made to the accompanying drawings, wherein:

FIG. 5 is a front view of the mechanism shown in FIG. 4 after the camera operating lever is depressed; and FIG. 6 is a graph showing the relation of the automatically selected shutter speeds and diaphragm openings.

Figure 1:
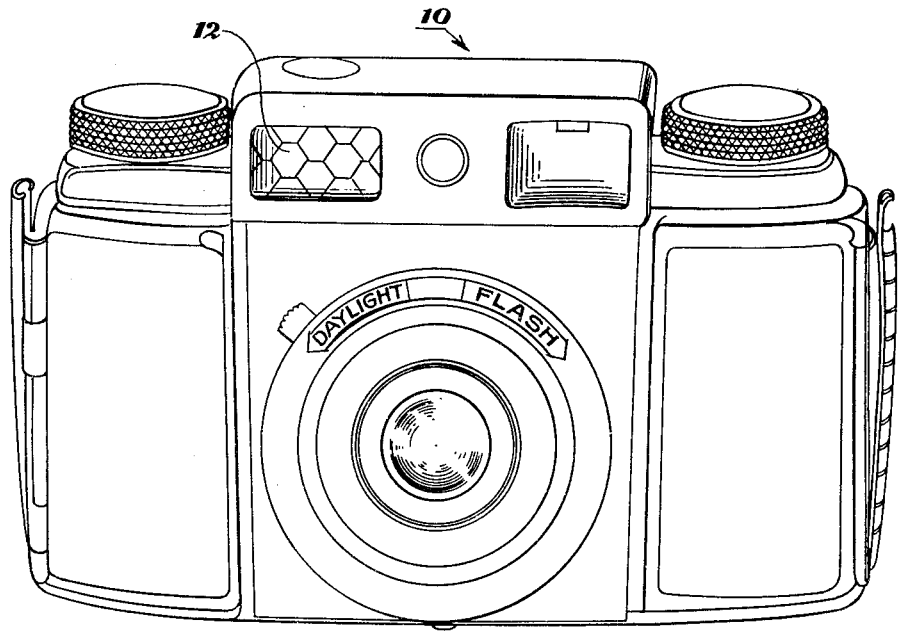
FIG. 1 is a front view of a still camera embodying the present invention.

A camera 10 (FIG. 1) is provided with a photocell unit 12 (see also FIG. 5), which is connected to and energizes a galvanometer 14. The photocell and galvanometer circuit may be of any type well known in the art as described, for example, in U.S. Patent No. 2,528,716. The galvanometer has a moving coil 16 that is angularly positioned as a function of the intensity of light from the viewed scene. A pair of arms 18 and 20 are integral with coil 16 and rotate therewith. Arms 18 and 20 are employed to condition the shutter speed and to limit diaphragm opening, respectively, in the manner described hereinafter.

Figures 2, 3:
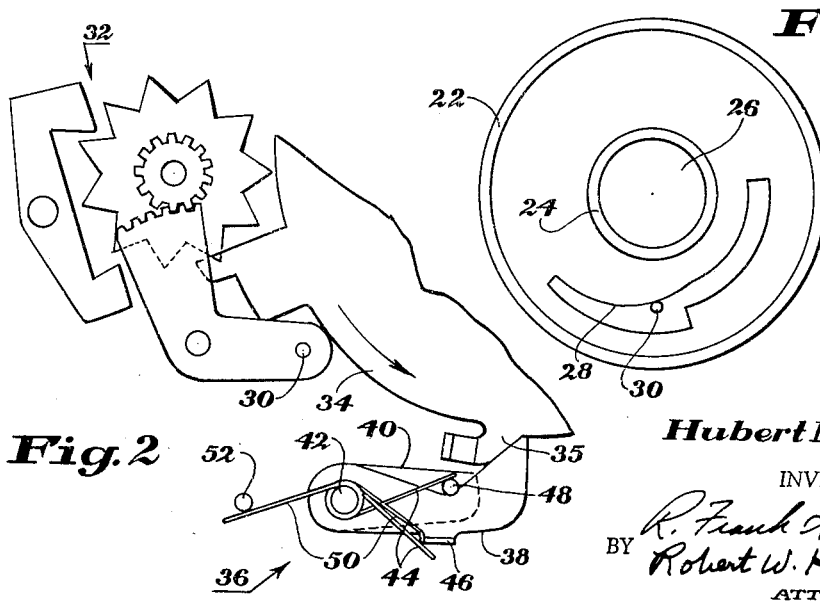
FIG. 2 is a front view of a portion of the shutter showing the split shutter drive lever.
FIG. 3 is a front view of the shutter speed ring.

The present invention is adapted for use with any multiple-speed pivoted-blade shutter mechanism, whether of the cocking or automatic type, wherein a moving element, as a function of its position, sets, conditions, or otherwise controls the operating speed of the shutter mechanism. To illustrate the invention, I have shown portions of a well-known type of cocking shutter mechanism wherein a speed ring 22 (FIG. 3) is mounted for rotation about a sleeve hub 24 that surrounds a fixed aperture 26, the latter being aligned with the lens axis of the camera. A cam surface 28 in the speed ring 22 cooperates with a pin 30 on a retard mechanism, indicated generally at 32 in FIG. 2. When ring 22 is rotated, cam 28 moves pin 30 radially to adjust the retard mechanism and thereby adjust the rate of movement of a cocking ring 34 as it travels from its cocked position to its uncocked position. During this movement an ear 35 on the cocking ring cooperates with a shutter drive lever, indicated generally at 36, to open and reclose the shutter blades at a speed determined by the initial setting of the speed ring 22 (FIG. 3). The operation of this type of shutter mechanism is well known to those skilled in the art. The entire shutter mechanism is disclosed in detail in Eastman Kodak Company Apparatus and Optical Division Service Manual No. 620, and the shutter mechanism is commercially available as a component of the Kodak Pony IV Camera.

It will appear from the later description of the shutter-diaphragm blades that these blades are differentially opened. However, in most shutters the drive lever, such as 36 in FIG. 2, is moved through a full cyclic stroke during each operation of the shutter mechanism. In such cases, it will be necessary to provide an articulated shutter drive lever which, in fact, may comprise two levers, the first being driven through a full cyclic stroke (by the cocking ring 34 in the illustrated shutter mechanism) and the second being differentially driven by the first through a partial stroke that is limited by the differential opening of the shutter-diaphragm blades.

The first and second levers, together constituting the shutter drive lever, are shown at 38 and 40, respectively, in FIG. 2. Both levers 38 and 40 are pivoted on a stud 42. A first torsion spring 44 is bent around stud 42 and cooperates with an ear 46 on lever 38 and a pin 48 on lever 40, thereby tending to maintain alignment between the two levers such that pin 48 on lever 40 abuts lever 38. A second torsion spring 50 also is bent around stud 42 and cooperates with a fixed stud 52 and a lateral surface of lever 38, tending to maintain the entire assembly of levers 38 and 40 and spring 44 in a counterclockwise position about stud 42, where lever 38 abuts the cocking ring 34 or the ear 35 on the cocking ring.

When the cocking ring is released by tripping the shutter it rotates in a counterclockwise direction, as shown by the arrow in FIG. 2. Ear 35 on the cocking ring engages lever 38, thereby rocking levers 38 and 40 clockwise about stud 42. Pin 48 on lever 40 extends through a respective oblong slot 54 and 56 (FIGS. 4 and 5) in each of a pair of shutter-diaphragm blades, or capping devices, 58 and 60 that are pivoted at 62 and 64, respectively. Slots 54 and 58 are arranged at an angle to each other and at an angle to the reciprocating path of pin 48 such that as pin 48 is reciprocated, blades 58 and 60 are rocked back and forth in opposite directions about their pivots.

Figure 4:
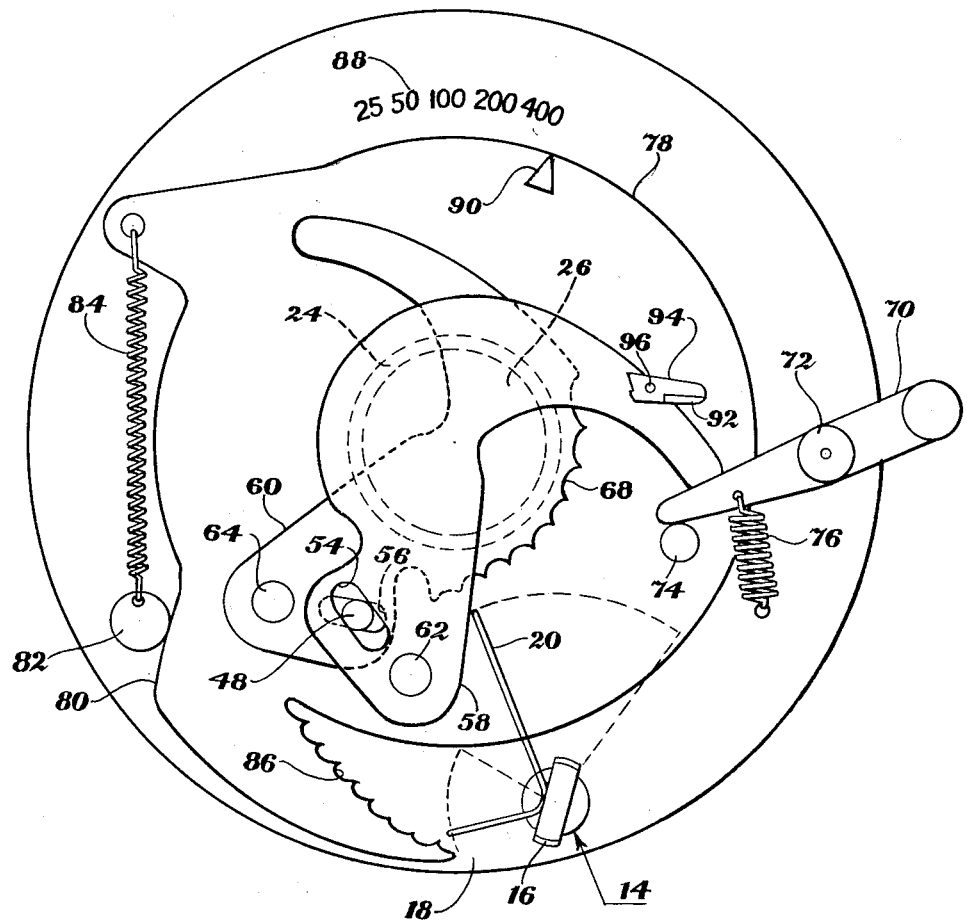
FIG. 4 is a front view of the shutter-diaphragm blades and shutter-speed sensing disk, showing their relation to the galvanometer and camera operating lever before the latter is depressed.

Blades 58 and 60 overlap each other in alignment with the fixed aperture 26 and normally cap that aperture, as shown in FIG. 4. During the shutter release cycle, the reciprocating movement of pin 48 rocks blades 58 and 60 away from each other temporarily, to form a diaphragm aperture 66 (FIG. 5) in axial alignment with the fixed aperture 26. The outer edge of blade 60 is serrated, as shown at 68, for cooperation with the previously described arm 20 on the galvanometer coil 16. When blades 58 and 60 are opened during the shutter release cycle, arm 20 limits the movement of these blades and thereby determines the size of aperture 66 as a function of the position of coil 16 and ultimately as a function of the intensity of light from the viewed scene. When blades 58 and 60 are stopped by arm 20, the cyclic motion of pin 48 and its lever 40 (FIG. 2) also is stopped. Lever 38, which must travel through a complete cyclic movement, is therefore rocked relative to lever 40 against the tension of spring 44 and is then returned by that spring into alignment with lever 40 during the latter part of the shutter release cycle.

The camera operating lever is shown at 70 in FIGS. 4 and 5. This lever is pivoted at 72 and normally is maintained against a stop 74 by a spring 76. Stop 74 is mounted on a shutter-speed sensing disk 78, which is integral with the shutter speed ring 22 (FIG. 3). Disk 78, like ring 22, is mounted on sleeve hub 24 for rocking movement about aperture 26. A lateral surface 80 (FIGS. 4 and 5) of disk 78 cooperates with a fixed stop 82 for limiting the clockwise rocking of the disk when lever 70 bears against stop 74 under the tension of spring 76. When the operating lever 70 is manually rocked clockwise against the tension of spring 76, a lighter spring 84 rotates disk 78 and the shutter speed ring 22 (FIG. 3) counterclockwise until a serrated edge 86 (FIG. 5) of the disk engages the previously described arm 18 on the galvanometer coil 16. This movement of ring 22 sets the shutter speed, which may be indicated, for example, on a fixed scale 88 cooperating with an index mark 90 on disk 78. Further clockwise rocking of lever 70 causes the inner end of that lever to engage an ear 92 on the shutter trigger lever 94, thereby pivoting lever 94 counterclockwise about a stud 96 to initiate a shutter release cycle in the manner well known in the art. During this cycle, the diaphragm aperture is established as described hereinbefore. The time duration of aperture 66 is determined by the shutter speed that has been set, i.e., by the position of disk 78, which is a function of the position of galvanometer coil 16 and ultimately a function of the intensity of light from the viewed scene.

When the camera operating lever is released it is rocked counterclockwise by spring 76, engaging stop 74 on disk 78 and rocking the disk clockwise against the tension of the weaker spring 84, until surface 80 of the disk engages fixed stop 82. The camera is then prepared for a next exposure.

It will have been observed that both the shutter speed and the diaphragm opening of a camera embodying the present invention are determined as functions of the light intensity from the viewed scene. Theoretically there are an infinite number of combinations of shutter speeds and diaphragm openings which will produce a "correct" exposure at any intensity of light from the viewed scene. Faster shutter speeds favor motion stopping whereas smaller diaphragm openings favor depth of field in the photograph. When the present invention is embodied in a particular camera, an arbitrary choice must be made as to the combination of shutter speed and diaphragm opening that will be produced in response to each setting of the galvanometer. In the preferred embodiment of the invention, each serration 86 on disk 78 and each serration 68 on blade 60 corresponds to a difference of one-half "stop" of diaphragm and shutter speed, respectively, from the adjacent serration. Therefore, a distance of one serration on the disk in combination with one serration on the blade corresponds to a full exposure stop or a factor of 2 in the intensity of light from the viewed scene. With minimum energization of galvanometer 16, arm 18 engages the leftmost serration of disk 78, while arm 20 engages the topmost serration of blade 60, corresponding, for example, to a shutter speed of $\frac{1}{25}$ second and a diaphragm opening of $f/4$, respectively. The next serrations on the disk and blade correspond to half-stop values, and the third serrations correspond to the next full stop values ($\frac{1}{50}$ second and $f/5.6$ in this case). Since both shutter speed and diaphragm opening are changed in the same direction, i.e., toward greater or less exposure, for any movement of galvanometer arms 18 and 20, the changes in shutter speed and diaphragm aperture are always additive. Therefore, a change of one-half stop in each value, corresponding to a distance of one serration on each member 60 and 78, produces a combined exposure change of one full stop. The relation of the shutter-diaphragm values is illustrated graphically in FIG. 6, wherein the axis of abscissas represents the useful range of light intensities or degrees of energization of the galvanometer.

The invention has been described in detail with particular reference to preferred embodiments thereof, but it will be understood that variations and modifications can be effected within the spirit and scope of the invention as described hereinabove and as defined in the appended claims.

I claim:

1. In a camera having a lens system for focusing an image of a viewed scene onto a photosensitive surface and having a multiple-speed shutter mechanism including at least one capping device normally interposed between said scene and said surface in alignment with said lens system for completely blocking said image from said surface and adapted, in response to operation of said shutter mechanism, for temporarily moving said capping device at least partially out of alignment with said lens system for a selected period of time to establish an exposure aperture, said shutter mechanism also including means for selecting the duration of said period of time; the combination comprising: a light-measuring instrument adapted to be exposed to light from said scene and differentially energized thereby as a function of the intensity of said light; first means controlled by said instrument and disposed in cooperative relation with said selecting means to control the duration of said period of time as a function of said intensity; and second means controlled by said instrument and disposed in cooperaitve relation with said capping device for limiting the movement of said capping device away from its position of alignment with said lens system to limit the size of said aperture as a function of said intensity.

2. In a camera having a manually movoble operating lever; a lens system forming a light path to focus an image of a viewed scene onto a photosensitive surface; and a shutter mechanism including (1) at least one pivoted blade interposed between said scene and said surface and having an initial position for totally blocking said light path and differentially pivoted positions for establishing apertures of graduated size in said light path; (2) drive mechanism connected to said blade and adapted, in response to operation of said drive mechanism, for pivoting said blade away from its initial position for a selected period of time; and (3) speed control means connected to said drive mechanism and including a movable member for selecting the duration of said time period as a function of the position of said movable member; the combination comprising: a light-measuring instrument adapted to be exposed to light from said scene and differentially energized as a function of the intensity of said light;

means interrelating said operating lever, said instrument and said movable member and controlled jointly by said operating lever and said instrument, in response to movement of said operating lever, for determining the position of said movable member; means controlled by said operating lever, in response to movement thereof, for initiating operation of said drive mechanism; and means interrelating said instrument and said blade and controlled by said instrument for limiting the pivoting movement of said blade as a function of the energization of said instrument.

3. The combination defined in claim 2, wherein said drive mechanism includes a first element having a predetermined cyclic driving movement; and a second element yieldably interconnecting said first element and said blade and driven by said first element for imparting a yieldable pivoting motion to said blade away from said rest position.

4. In a camera having a lens system for focusing an image of a viewed scene onto a photosensitive surface and having a multiple-speed shutter mechanism including at least one capping device normally interposed between said scene and said surface in alignment with said lens system for completely blocking said image from said surface and adapted, in response to operation of said shutter mechanism, for temporarily moving said capping device at least partially out of alignment with said lens system for a selected period of time to establish an exposure aperture, said shutter mechanism also including means for selecting the duration of said period of time; the combination comprising: a light-measuring instrument adapted to be exposed to light from said scene and differentially energized thereby as a function of the intensity of said light; means controlled by said instrument and disposed in cooperative relation with said selecting means to control the duration of said period of time as a function of said intensity; and adjustable means disposed in cooperative relation with said capping device away from its position of alignment with said lens system to selectively limit the size of said aperture.

5. In a camera having a lens system for focusing an image of a viewed scene onto a photosensitive surface and having a multiple-spaced shutter mechanism including at least one capping device normally interposed between said scene and said surface in alignment with said lens system for completely blocking said image from said surface and adapted, in response to operation of said shutter mechanism, for temporarily moving said capping device at least partially out of alignment with said lens system for a selected period of time to establish an exposure aperture, said shutter mechanism also including means for selecting the duration of said period of time; the combination comprising: a light-measuring instrument adapted to be exposed to light from said scene and differentially energized thereby as a function of the intensity of said light; means controlled by said instrument and disposed in cooperative relation with said selecting means to control the duration of said period of time as a function of said intensity; and means disposed in cooperative relation with said capping device for limiting the movement of said capping device away from its position of alignment with said lens system to limit the size of said aperture.

6. In a camera having a lens system adapted to form a light path for focusing an image of a viewed scene onto a photosensitive surface, and having a light-measuring instrument adapted to be exposed to light from said scene, said instrument having a movable member differentially positioned as a function of the intensity of said light; the combination comprising: a combined shutter and diaphragm device comprising at least one pivoted blade having a rest position for completely blocking said light path and movable to a plurality of operated positions for establishing apertures of graduated size in said light path; means connected to said blade for moving the latter away from its rest position; means including an edge surface on said blade disposed in cooperative relation with said movable member for differentially controlling the extent of movement of said blade; and means interrelating said movable member and said blade for differentially controlling the rate of movement of said blade.

7. The combination defined in claim 6, wherein said blade edge is serrated, and wherein said interrelating means includes: (1) a positionally adjustable member whose position determines said rate of movement; (2) means for yieldably moving said adjustable member; and (3) a serrated surface on said adjustable member disposed in cooperative relation to said movable member for limiting the movement of said adjustable member, the adjacent serrations on said blade and said adjustable member corresponding to successive half-stop exposure values.

8. In a camera having a lens system adapted to form a light path for focusing an image of a viewed scene onto a photosensitive surface, and having a light-measuring instrument adapted to be exposed to light from said scene, said instrument having a movable member differentially positioned as a function of the intensity of said light; the combination comprising: a combined shutter and diaphragm device having a rest position for completely blocking said light path and movable to a plurality of operated positions for establishing apertures of graduated size in said light path; means connected to said device for moving said device away from its rest position; first means interrelating said movable member and said device for differentially controlling the extent of movement of said device; and second means interrelating said movable member and said device, including a positionally adjustable member for differentially controlling the rate of movement of said device as a function of the position of said last-named member, drive means connected to said adjustable member for yieldably moving the latter, and a surface on said adjustable member adapted to cooperate with said movable member to limit the movement of said adjustable member as a function of the position of said movable member.

References Cited in the file of this patent
UNITED STATES PATENTS

| | | |
|---|---|---|
| 761,756 | Brueck | Aug. 11, 1902 |
| 885,142 | Brownell | Apr. 21, 1908 |
| 2,058,531 | Tuttle | Oct. 27, 1936 |
| 2,187,953 | Schmidt | Jan. 23, 1940 |
| 2,418,370 | Simmon | Apr. 1, 1947 |
| 2,868,095 | Gebele | Jan. 13, 1959 |
| 2,906,166 | Herterich | Sept. 29, 1959 |
| 2,913,969 | Faulhaber | Nov. 24, 1959 |
| 2,969,007 | Groger | Jan. 24, 1961 |